Aug. 24, 1926.
H. LE V. HORNING
1,597,197
INTAKE MANIFOLD
Filed March 1, 1920    2 Sheets-Sheet 1
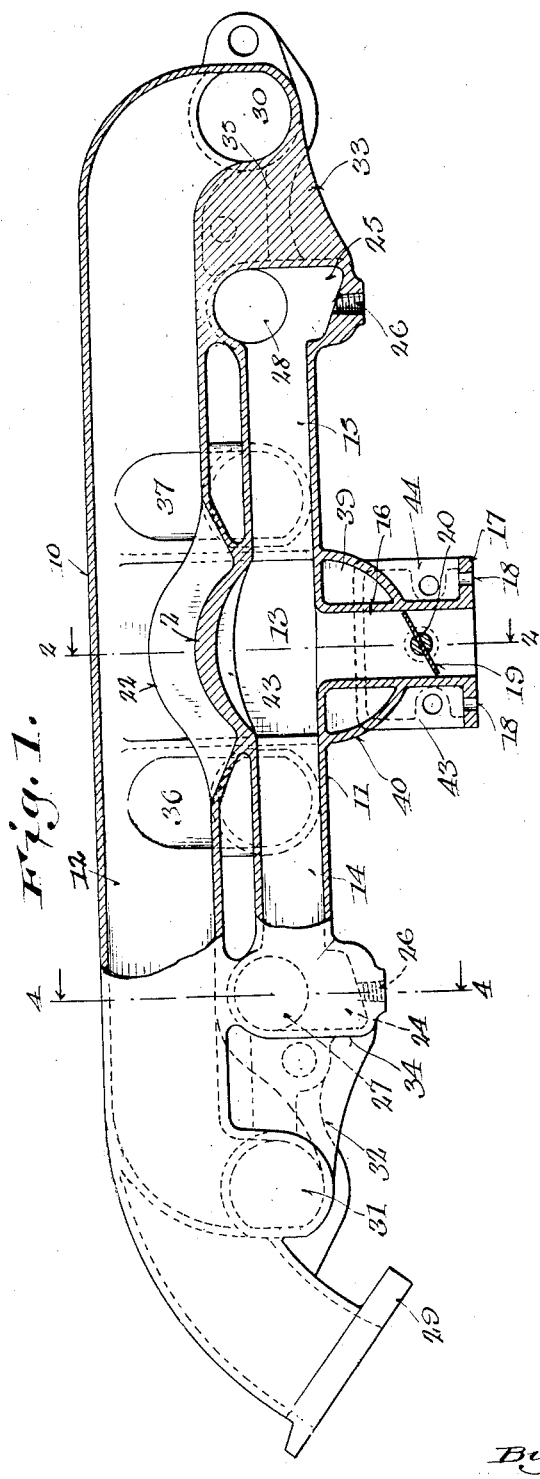
Inventor
Harry L. Horning
By Brown Berliner and Dennis Attorneys.

Aug. 24, 1926.
H. LE V. HORNING
1,597,197
INTAKE MANIFOLD
Filed March 1, 1920    2 Sheets-Sheet 2
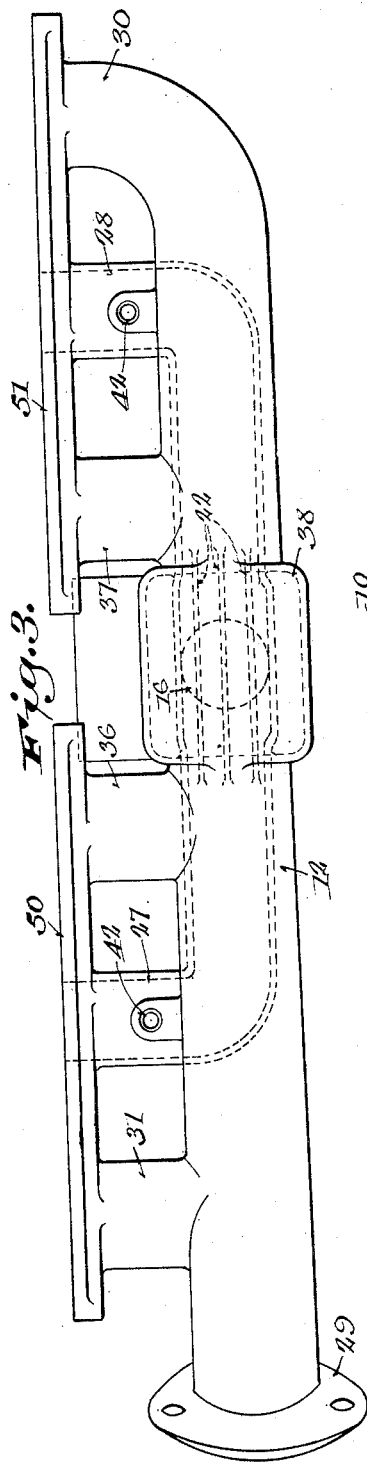
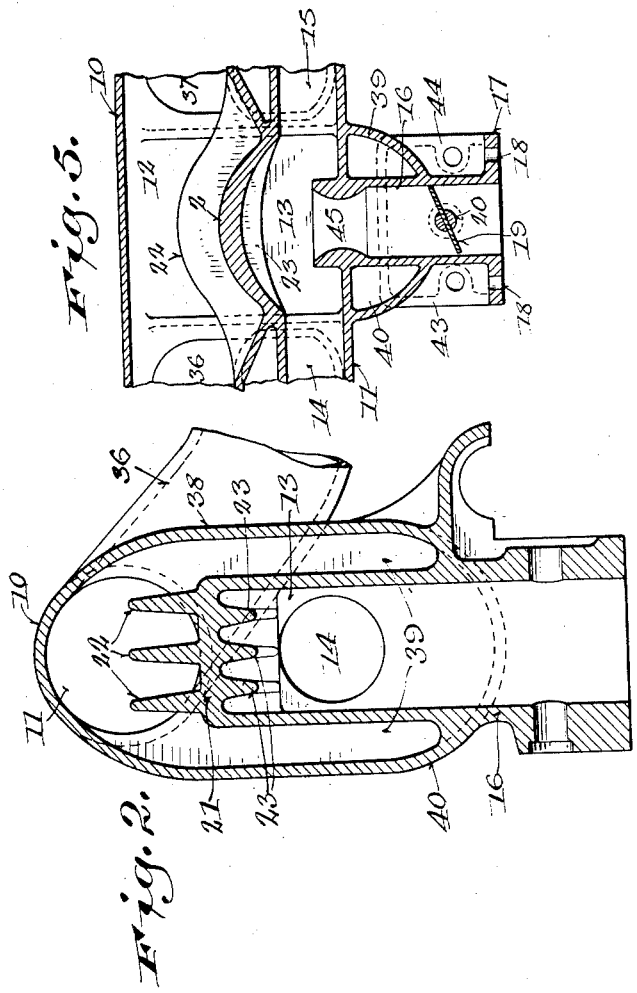
Inventor
Harry L. Horning
By Brown Boucher and Dinner Attorneys.

Patented Aug. 24, 1926.

1,597,197

UNITED STATES PATENT OFFICE.

HARRY LE VAN HORNING, OF WAUKESHA, WISCONSIN.

INTAKE MANIFOLD.

Application filed March 1, 1920. Serial No. 362,335.

This invention relates to improvements in intake manifolds for internal combustion engines, and has particular reference to the combining of intake and exhaust manifolds whereby to increase the efficiency of an engine by eliminating in a large degree the condensation of fuel and the delivery of the same in such form to the engine cylinders.

It is well known to those familiar with the art that much of the loss of power, knocking and other internal faults in the operation of a modern internal combustion engine are due largely to the inefficient vaporization or fuel, the fuel often being delivered to the cylinders in alternate bodies of vapor and liquid.

It is impossible for all of the particles of fuel in liquid form to be efficiently burned, which results in the deposit of the fuel in liquid form on the cylinder head and walls, and on the spark plug, with the subsequent production of carbon deposits, which impair the efficiency of the motor.

With the foregoing in view, I have designed the present invention with the object of distributing the charge of atomized fuel and delivering the same to the engine cylinders with a minimum amount of condensation and to prevent delivery to the cylinders of any precipitates or condensates of the vaporized fuel.

I accomplish this object by; first distributing the exhaust heat of the engine to points on the intake manifold at which most of the condensation usually takes place, secondly. by distributing the liquid fuel precipitated from, or condensed in the mixture to the points mentioned. Then, any fuel which may still be in liquid form after passing through the intake manifold is either reduced to vapor just before entering the cylinders or is caused to be precipitated into suitable recesses for this purpose, from which the same will be gradually vaporized or withdrawn later.

I also provide a water opening preferably beyond the entrance to the intake manifold and adjacent the point at which the mixture enters the cylinders, as my invention is particularly adapted for the burning of heavy hydrocarbon, although, of course, I do not limit myself to its use in this connection.

It will be seen from the foregoing and from the detail description following that I cause the fuel in liquid form to be vaporized; and any excessively large particles to be precipitated out of the mixture rather than carried to the cylinders, this being done in a maximum degree with relation to a definite minimum area of heated surface in the intake manifold. The latent heat of the particles deposited is given up to the cylinders, maintaining the constancy of the temperature of the mixture and preventing the mixture from overheating with a consequent overheating of the walls and other parts of the cylinders.

I also intend to provide means for concentrating the mixture as the same enters the intake manifold upon a heated portion of the manifold so as to gain the best results immediately upon the entrance of the fuel mixture into the manifold and to further concentrate the mixture and heated surface just before leaving the manifold so that any particles not deposited will either be deposited at that time or vaporized before entering the cylinders. This insures a constancy of temperature and condition of mixture and effectually prevents any introduction to the cylinders of liquid or any unvaporized fuel. As will appear in the description of the operation, it will be seen that I separate the liquid fuel particles, reduce the same to a vapor and then return the vapor to the mixture.

Other objects and advantages to be derived from my improved combined intake and exhaust manifold will appear from the following detail description and the claims taken in connection with the accompanying drawing, in which:

Figure 1 is a longitudinal sectional view of my invention, a portion of the same being shown in elevation;

Figure 2 is a vertical section taken on the line 2—2 of Figure 1;

Figure 3 is a top plan;

Figure 4 is a section on the line 4—4 of Figure 1, and

Figure 5 is a fragmentary section showing a modified form of the invention.

Referring more particularly to the drawing. wherein the preferred embodiment of my invention is illustrated. 10 designates in its entirety the casting from which the intake manifold 11 and exhaust manifold 12 are formed. The intake manifold consists preferably of a central entrance compartment 13 provided with lateral tubular extensions 14 and 15 forming the distributing arms of the manifold.

The intake manifold 11 is provided with an entrance throat or extension 16 formed with a flange 17, provided with openings 18 to receive bolts or the like for securing the same to a carburetor of any approved type. A valve 19 is mounted on a suitable shaft 20 in said throat 16 for controlling the delivery of material therethrough. The contiguous portion of the walls of the arms 14 and 15 and the exhaust manifold 12 converge over the compartment 13 to form a single wall 21, said wall 21 having ribs 22 extending into the exhaust manifold and also ribs 23 extending into the compartment 13. The purpose of these ribs is to enhance the transmission of heat through said wall 21, and the dissemination of this heat within the compartment 13.

The free ends of the arms 14 and 15 are enlarged to form traps 24 and 25 provided with suitable threaded opening 26 adapted to receive a bleeder valve or the like, not shown. The enlargements 24 and 25 have formed thereon, and extending laterally relative the manifold, a pair of tubular extensions 27 and 28 which are connected to the intake ports of an internal combustion engine, not shown.

The free ends of the exhaust manifold are provided, one with an annular flange 29 for connection to a suitable exhaust pipe, and the other with a laterally extending elbow 30 for connection to the exhaust chamber of the internal combustion engine. A similar extension 31 is provided adjacent the flange 29 and in the same plane with the elbow 30. Webs 32 and 33 extend between the outer walls 34 and 35 of the enlargements 24 and 25 on the intake manifold, said webs serving to conduct heat from the exhaust manifold to the walls 34 and 35, and also serving to strengthen the structure at this point.

Suitable lateral inclined extensions 36 and 37 are formed on the exhaust manifold 12 for connection to the exhaust chambers of two of the cylinders of the internal combustion engine. The manifold as shown and described is particularly adapted to the four-cylinder type of engine, but it will be readily apparent that I need not limit myself to the adaptation of the invention to an engine having any specific number of cylinders.

Upon reference to Figure 2 it will be noted that the exhaust manifold is provided with an enlargement 38 which embraces the compartment 13 of the intake manifold and is slightly spaced therefrom to form a heat chamber 39. The enlargement 38 being extended below the intake manifold as at 40 so that the chamber 39 will embrace the entrance throat 16.

In the operation of my invention as concerns the prefered form, it will be seen that upon the entrance of the atomized fuel into the intake manifold through the throat 16 and past the valve 19, this fuel is immediately subjected to a vaporizing treatment, the effect of the heat derived from the throat 16 being enhanced by the impinging of the heavier particles of fuel against the wall 21 and ribs 23, thereby insuring, if not complete vaporization, at least an advance in the vaporization process. This super-vaporization of the fuel is continued by the impinging of the heavier particles not vaporized at the entrance upon the walls 34 and 35. The impinging of such particles on the walls 34 and 35 is produced by virtue of the sudden diverting of the mixture at substantially right angles into the elbows 27 and 28, the mixture gaining speed as the same passes through the arms 14 or 15 as the case may be. The last remaining particles of liquid fuel which were not vaporized at the initial pre-heating of the mixture either impinge upon the walls 34 and 35 and are thereby vaporized and carried on into the cylinders, or are deposited out of the mixture and gather in the traps 24 and 25. Thus, the liquid fuel deposited out of the mixture and collected in the trap 24 and 25 may be used as priming charge later, or may be withdrawn and returned to the source of suppy. The webs 32 and 33 serve to conduct heat from the exhaust manifold to the walls 34 and 35 and maintain the same at a relatively high temperature. It will be apparent that I provide an efficient distribution of the combustible charge throughout the intake manifold to cause a deposition of the heavier particles of the fuel which fail to become vaporized, and vaporize the unvaporized lighter particles of fuel. The areas to be supplied with heat are maintained at such a temperature that practically all of the liquid fuel will be vaporized and therefore the temperature of the mixture entering the cylinder will be practically constant. With a fairly constant mixture ratio, the vapor temperature will be that of the average heat of vaporization, while the temperature of the mixture entering the cylinder will be that attained by it, due to latent heat of vaporization given up by the vapor condensing to mist or small liquid particles and dropping into the trap. I provide water openings 42 in the elbows 27 and 28, as, while I do not intend to limit the use of my invention to vaporization of hydro-carbons having high boiling point, it is often desirable that water be mixed in small quantities with the fuel when possessing the burning quantities of kerosene and the like, as is well known by those skilled in the art.

The entrance throat 16 is provided with flanges 43 and 44 at the rear thereof, in order to afford means for bolting that portion of the manifold to the engine body.

In the modified form of the invention shown in Figure 5 I mount a Venturi tube 45 in the throat 16, the tube extending partly into the chamber 13 so as to direct the mixture toward the heated wall 21.

While I have described a preferred embodiment of my improved manifold, it is to be understood that I do not limit myself to the details thereof, nor to the specific form of the device. It will be apparent that by slight modifications the manifold may be adapted for use in connection with internal combustion engines having various numbers of cylinders. It will also be apparent, in the event that it is desired to provide the exhaust manifold with a central outlet rather than the end outlet shown, this may be readily provided by forming a suitable opening in the top of the manifold and connecting the exhaust pipe thereto. In such a form the end opening would be omitted and both ends of the exhaust manifold would be identical. The exhaust and intake arms are integrally connected by flanges 50 and 51 which are bolted to the engine body.

From the foregoing description it will be obvious that the mixture entering the intake manifold may be governed by the valve 19 if desired. It is not essential that the valve 19 be employed, but the same has been shown, as in some cases a governor valve is placed in this position. Any condensation of the fuel due to contact with the valve 19 or with the part of the carburetor beyond the mixing chamber, such as the throttle, is taken care of upon the entrance of the fuel mixture into the chamber 13, as hereinbefore pointed out.

I claim:

1. In combination, an intake manifold shaped to throw fuel out of the main stream at the middle and again at each end, localized heating means for heating each spot where fuel tends to collect, the remainder of said manifold being unheated, the end hot spots being downwardly extending pockets with individual apertures in their bottoms for cleaning.

2. The method of treating a mechanically atomized charge of hydro-carbon, which consists in directing the charge in succession against a plurality of localized heating surfaces for vaporization of the liquid fuel particles contained therein, and thereafter separating from the mixture the liquid fuel particles not vaporized.

3. The method of treating a mechanically atomized charge of hydro-carbon, which comprises throwing it against a heated wall under deflection thereby, conveying it without further heating to the next turn in its path of movement, and heating it further at said turn, the heating in each instance being limited to the deflecting wall.

4. The method of treating a mechanically atomized charge of hydro-carbon, which comprises mixing and warming it in a plurality of separate steps, and at the last step separating out unvolatilized particles.

5. The method of treating a mechanically atomized charge of hydro-carbon, which comprises mixing and warming it in a plurality of separate steps, at the last step separating out unvolatilized particles and holding the material thus obtained in good thermal contact with the stream of mixture to stabilize the temperature thereof.

6. In combination, an inlet manifold, a plurality of separate heating means located in series along the path of the mixture, and separating means associated with the last heating means before the mixture enters the engine.

7. In a manifold construction, in combination, walls defining port passages leading laterally to the intake ports of the engine, a horizontal passage joining the ends of said port passages, said horizontal passage being offset below said port passages, a downwardly extending pocket below the shoulder formed by each offset, and a direct metallic thermal connection between the top and side of each pocket and the exhaust manifold, said exhaust manifold being offset downwardly around the outer end of said intake manifold.

8. In a manifold construction, in combination, walls defining port passages leading laterally to the intake ports of the engine, a horizontal passage joining the ends of said port passages, said horizontal passage being offset below said port passages, a downwardly extending pocket below the shoulder formed by each offset, and a thermal connection between the top and side of each pocket and the exhaust manifold.

9. In a manifold construction, in combination, walls defining port passages leading laterally to the intake ports of the engine, a horizontal passage joining the ends of said port passages, a downwardly extending pocket below each end of said horizontal passage, and a direct metallic thermal connection between the top and side of each pocket and the exhaust manifold, said exhaust manifold being offset downwardly around the outer end of said intake manifold.

In witness whereof, I hereunto subscribe my name this 20th day of February, A. D. 1920.

HARRY LE VAN HORNING.